(12) United States Patent
Metz (10) Patent No.: US 8,991,113 B2
(45) Date of Patent: Mar. 31, 2015

(54) LOADING DOCK SEALING APPARATUS AND METHOD

(75) Inventor: Donald L. Metz, Kirkville, NY (US)

(73) Assignee: DL Manufacturing, North Syracuse, NY (US)

(\*) Notice: Subject to any disclaimer, the term of this patent is extended or adjusted under 35 U.S.C. 154(b) by 0 days.

(21) Appl. No.: 14/237,791

(22) PCT Filed: Aug. 10, 2012

(86) PCT No.: PCT/US2012/050321
§ 371 (c)(1),
(2), (4) Date: May 22, 2014

(87) PCT Pub. No.: WO2013/023136
PCT Pub. Date: Feb. 14, 2013

(65) Prior Publication Data
US 2014/0318044 A1    Oct. 30, 2014

Related U.S. Application Data

(60) Provisional application No. 61/522,007, filed on Aug. 10, 2011.

(51) Int. Cl.
*E04D 13/18* (2014.01)
*E04H 14/00* (2006.01)
*B65G 69/00* (2006.01)

(52) U.S. Cl.
CPC .................................. *B65G 69/008* (2013.01)
USPC ........................... 52/173.2; 52/173.1; 52/2.12

(58) Field of Classification Search
USPC ...................... 52/173.2, 173.1, 2.12
See application file for complete search history.

(56) References Cited

U.S. PATENT DOCUMENTS

| | | |
|---|---|---|
| 3,854,257 A | 12/1974 | Lobel |
| 3,875,954 A | 4/1975 | Frommelt et al. |
| 4,679,364 A | 7/1987 | Fettig et al. |
| 5,048,246 A | 9/1991 | Sullivan |
| D348,387 S | 7/1994 | Sullivan |
| 5,953,868 A | 9/1999 | Giuliani et al. |
| 6,170,205 B1 | 1/2001 | Styba |
| 6,854,224 B2 | 2/2005 | Thill et al. |
| 6,948,285 B2 | 9/2005 | Miller et al. |
| 7,383,664 B2 | 6/2008 | Chalfant |
| 7,695,048 B2 | 4/2010 | Hoffman |

(Continued)

OTHER PUBLICATIONS

International Preliminary Report on Patentability for Corresponding International Application No. PCT/US2012/050321 dated Feb. 11, 2014 (10 pgs).

*Primary Examiner* — Mark Wendell
(74) *Attorney, Agent, or Firm* — Harris Beach PLLC (57) ABSTRACT

A method and apparatus are provided for sealing a vehicle cargo area to a loading dock. The method includes a step of providing a sealing element. The sealing element includes a mounting surface adapted to sealingly mate against a loading dock, an inner sealing surface at a transverse angle relative to the mounting surface, an outer sealing surface opposing the inner sealing surface and at a transverse angle relative to the mounting surface, and an impact-absorbing surface approximately parallel to the mounting surface. The method further includes the steps of contacting the impact-absorbing surface with a rear face of the vehicle cargo area, deforming the inner sealing surface away from the loading dock, and sealing the inner sealing surface against an inside wall of the vehicle cargo area.

19 Claims, 8 Drawing Sheets

(56) References Cited

U.S. PATENT DOCUMENTS

| | | |
|---|---|---|
| 7,703,245 B2 | 4/2010 | Chalfant |
| 7,757,442 B2 | 7/2010 | Hoffmann et al. |
| 8,042,307 B2 | 10/2011 | Digmann et al. |
| 8,046,857 B2 | 11/2011 | Whitley et al. |
| 8,112,948 B2 | 2/2012 | Desjardins |
| 8,141,305 B2 | 3/2012 | Digmann et al. |
| 8,156,995 B2 | 4/2012 | Kniese |
| 8,353,136 B2 | 1/2013 | Ashelin et al. |
| 8,495,838 B2 | 7/2013 | Digmann et al. |
| 2003/0230033 A1 | 12/2003 | Shelton |
| 2004/0261335 A1 | 12/2004 | Eungard |
| 2006/0026912 A1 | 2/2006 | Eungard et al. |
| 2009/0064605 A1 | 3/2009 | Hoffman |
| 2009/0077906 A1 | 3/2009 | Tramonte, Jr. et al. |
| 2009/0178349 A1 | 7/2009 | Schmidt |
| 2010/0251639 A1 | 10/2010 | Hoffmann et al. |
| 2012/0000150 A1 | 1/2012 | Digmann et al. |
| 2013/0221624 A1 | 8/2013 | Digmann et al. |
| 2013/0239494 A1 | 9/2013 | Digmann et al. |
| 2013/0255159 A1 | 10/2013 | Hoffmann |

LOADING DOCK SEALING APPARATUS AND METHOD

CROSS-REFRERNCE TO RELATED APPLICATIONS

This application is a national stage application under 35 U.S.C. §371 of PCT Application No. PCT/US2012/050321, filed Aug. 10, 2012, which claims priority to and the benefit of U.S. Application No. 61/522,007 filed on Aug. 10, 2011, which are incorporated herein by reference in their entirety.

FIELD OF THE INVENTION

This disclosure relates generally to sealing devices for loading docks and, more specifically, to a cushioned sealing device that offers superior sealing under a wide variety of conditions.

BACKGROUND OF THE INVENTION

A loading dock for a vehicle such as a trailer truck or box truck commonly includes an overhead door of a width and height sufficient to accommodate the interior region of the trailer cargo area. When the overhead door is open, the truck backs towards the loading dock until the rear of the cargo compartment engages the dock. The cargo compartment of the truck is thus roughly aligned with the opening of the loading dock. The truck may have an overhead door or, more commonly, hinged panel doors that swing open and are stowed against the side of the trailer.

In some loading dock operations, there is a large difference in temperature between the inside of the truck cargo area and the outside environment, or between the interior of the loading bay and the outside environment, or both. For example, a refrigerated trailer may dock to a refrigerated loading bay, and there may be a large temperature difference between the vehicle cargo area/loading bay and the outside environment. The cargo may include perishable items or items required to be kept cold to comply with government regulations. Both the trailer's refrigerated cargo area and the refrigerated loading bay may be controlled to approximately the same temperature, but the outside environment may be significantly warmer.

In another example, the loading bay may be part of a building situated in a cold climate. The loading bay may be heated to a comfortable temperature for employees, while the outside temperature may be below freezing.

In yet another example, the loading bay may be in a building located in a hot climate. The loading bay may be air-conditioned to a comfortable temperature for employees, while the outside temperature may be hot and humid.

In each of the above examples, if the cargo area of the truck is not properly sealed against the loading dock door, interface gaps will permit interchange of the warm and cold air. Lack of proper sealing could be caused by an inadequate sealing structure, for example, or by misalignment of the cargo trailer relative to the loading dock.

An inadequate sealing structure includes the failure to properly seal the hinge gap. A hinge gap arises from the pair of swinging panel doors that provide access to the vehicle's rear cargo area. A series of hinges on the vehicle's two rear vertical edges attach the door panels to the vehicle's side wall panels. To access the vehicle cargo area, the two door panels are swung outward away from the rear of the vehicle and stored against the exterior surface of vehicle's side body panels. This can leave a significant hinge gap between the rear of the vehicle and the face of the building.

The interface gaps, including the hinge gap, could in one example allow warm, outside air to flow into a refrigerated vehicle cargo area or loading dock, causing premature food spoilage or noncompliance with governmental temperature regulations. In another example, the interface gaps could cause cold, outside air to flow into the heated space of the building interior, placing extra demands on the heating system and/or resulting in an uncomfortably cold working condition.

Some loading docks have been adapted with devices to provide sealing around the perimeter of the loading dock door frame. One such device comprises foam blocks positioned around the perimeter of the loading bay door. Although the foam provides superior thermal insulation, one noted problem with the foam is that, due to its inherent resiliency, it does not deform very much under load. Therefore, when a trailer backs toward the dock, the trailer must exert a great deal of force to sufficiently compress the foam to effect a good seal. Further, if the trailer bumps into the foam, the foam does not absorb the shock load well. In both circumstances, the trailer loads are transferred directly to the building wall, which, over time, can cause structural damage.

Another sealing device comprised an inflatable bag fitted around the perimeter of the loading dock door frame. Although the inflatable bag solved the problem associated with shock loads, and provided good thermal insulation, the bag often deformed into the passageway of the loading area (e.g., along the sides or top) and created an obstruction hazard for personnel or fork trucks. The exposed air bag material could be a tripping hazard for people loading and unloading the truck. Or, if hit by a fork truck, the bag material could rupture and have to be replaced. The inflatable bags were also prone to puncturing and had to be replaced.

SUMMARY OF THE INVENTION

Therefore, in one aspect of the invention a loading dock sealing assembly is provided between a loading bay door and a truck's cargo area that accommodates misalignment and size differences between trucks and provides a superior seal. The sealing assembly includes a sealing element. The sealing element includes a mounting surface coplanar with the loading dock and adapted to sealingly mate against the loading dock, and an inner sealing surface at a transverse angle relative to the mounting surface, adapted to sealingly mate against an inside wall of the vehicle cargo area. The sealing element further includes an outer sealing surface opposing the inner sealing surface and at a transverse angle relative to the mounting surface. The outer sealing surface is adapted to sealingly mate against an outside surface of the vehicle cargo area. The sealing element further includes an impact-absorbing surface approximately parallel to the mounting surface. The impact-absorbing surface is adapted for contact with a vehicle cargo area rear face. Upon application of a force by the vehicle cargo area frame to the impact-absorbing surface, the inner sealing surface deforms to sealingly mate against the inside wall of the vehicle cargo area and the outer sealing surface deforms to sealingly mate against the outside surface of the vehicle cargo area.

In another aspect of the invention, a method is provided for sealing a vehicle cargo area to a loading dock. The method includes a step of providing a sealing element. The sealing element includes a mounting surface adapted to sealingly mate against a loading dock, an inner sealing surface at a transverse angle relative to the mounting surface, an outer sealing surface opposing the inner sealing surface and at a transverse angle relative to the mounting surface, and an impact-absorbing surface approximately parallel to the mounting surface. The method further includes the steps of contacting the impact-absorbing surface with a rear face of the vehicle cargo area, deforming the inner sealing surface away from the loading dock, and sealing the inner sealing surface against an inside wall of the vehicle cargo area.

BRIEF DESCRIPTION OF THE DRAWINGS

The features described herein can be better understood with reference to the drawings described below. The drawings are not necessarily to scale, emphasis instead generally being placed upon illustrating the principles of the invention. In the drawings, like numerals are used to indicate like parts throughout the various views.

DETAILED DESCRIPTION OF THE INVENTION

Figure 1:
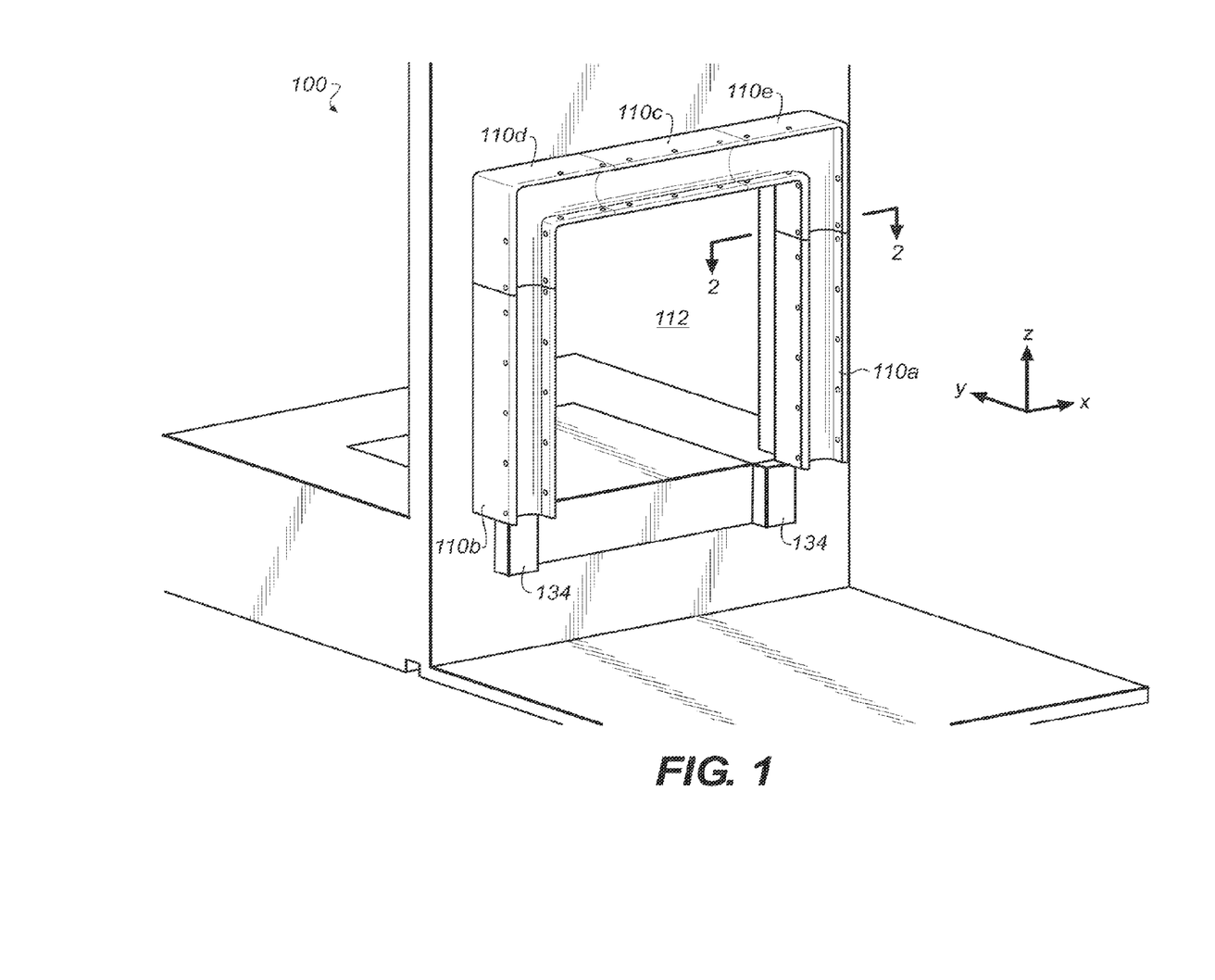
FIG. 1 depicts a perspective view of a loading dock sealing assembly according to one embodiment of the current invention.

Referring to FIG. 1, disclosed is a loading dock sealing assembly 100 that solves the problems associated with trailer misalignment, hinge gap leakage, and excessive loading on the building wall. The loading dock sealing assembly 100 includes a plurality of sealing elements 110 shown installed on a loading dock 112. In one embodiment, the sealing element 110 has a main body portion and a flexible U-shaped feature that encapsulates the back frame of a vehicle. As the vehicle backs into the sealing element 110, the U-shaped feature deforms and closes in on the inner and outer side walls of the vehicle, thereby sealing an interior region of the vehicle cargo area from the outside environment. The sealing element 110 may comprise a single piece enveloping the frame of the loading dock 112 or, as illustrated, may include two vertically-oriented side members 110a and 110b, a horizontally-oriented header member 110c, and two joining corner members 110d, 110e. The loading dock sealing element 110 is secured to the perimeter of the loading dock 112 by any convenient mechanical means such as bolting, or by adhesive, for example.

For purposes of illustration and to further explain orientation of certain features of the invention, a lateral axis is defined as substantially parallel to the loading dock wall and is denoted as the x-axis; a longitudinal axis is defined as substantially in the direction of vehicle motion when backing into the loading dock and is denoted as the y-axis; and the vertical axis is denoted as the z-axis.

Figure 2:
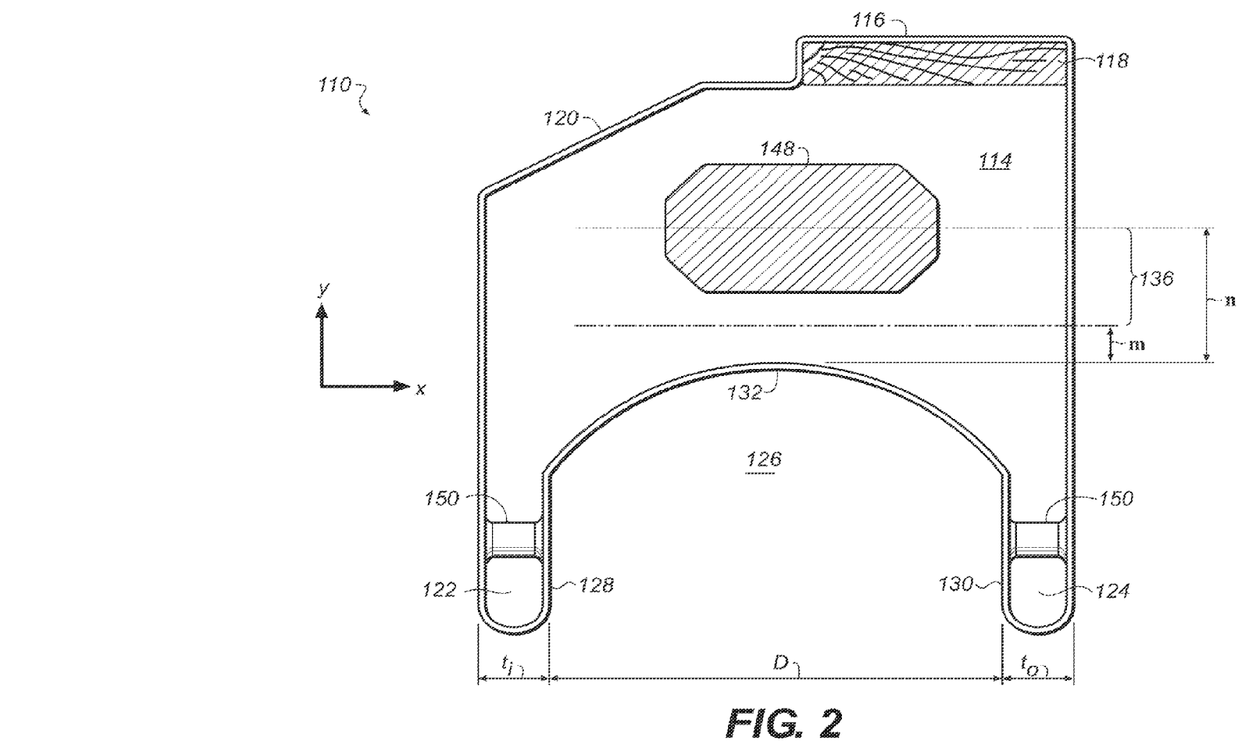
FIG. 2 depicts a cross-sectional top view of a sealing element in FIG. 1.

FIG. 2 depicts the sealing element 110 in cross section. The sealing element 110 is soft and pliable to allow deformation under load that advantageously aides in forming a seal between the outside environment and the walls and roof of the vehicle cargo area. In this regard, the sealing element 110 may be formed of a thermoplastic polymer. In one embodiment, the thermoplastic polymer may be molded to form a closed skin, defining an internal cavity 114 that may include a fluid. The term fluid is intended to be interpreted broadly so as to include liquids, gases, or mixtures of both. For example, the fluid may be water, glycol, air, nitrogen, or a gel. In one example, the fluid is compressed air.

In a further example, the sealing element 110 may be formed of a thermoplastic polymer that is homogeneous. By homogeneous, it is meant that the sealing element 110 is formed of a single material, unlike prior art sealing members that comprise a foam core with an outer layer of material. In some embodiments, the sealing element 110 comprises a homogeneous thermoplastic polymer that forms a closed skin, thereby creating the internal cavity 114. The sealing element 110 may be formed by a rotational molding process (e.g., rotomolding or spin casting), in which a hollow mold is first created that defines the outer contours of the sealing element 110. A measured quantity of the thermoplastic polymer is placed in the mold, and the mold is then heated and rotated about multiple axes. As the temperature of the hollow mold increases, the thermoplastic material softens and adheres to the inner walls of the mold. The mold continues to rotate at all times during the heating phase in order to maintain an even thickness and to avoid sagging or deformation during the cooling phase. After cooling, the finished sealing element 110 is removed from the mold. The inventor has determined that a candidate material for the disclosed sealing element 110 is flexible polyvinylchloride having a thickness in the range of 0.08 to 0.25 inches (0.20 to 0.64 cm). Other candidate materials include low density polyethylene, and some high density polyethylenes including cross-linked polyethylene.

The sealing element 110 includes a mounting surface 116 coplanar with the loading dock and adapted for installation to the wall of the building. As described above, the installation means may include an adhesive or, as illustrated, a 2"×8" wooden board 118 secured on one face to the sealing element 110 and on an opposing face to the building using conventional hardware. The back side of the sealing element 110 may include a relief 120 intended to minimize the effects of contact with fork trucks and the like. The relief 120 may be an angular cut or rounded, similar to a chamfer, to remove the corner of the sealing element 110 facing the inside of the loading dock doorway. In the event of collision or similar contact with fork trucks, hand trucks or the like, the relief 120 prevents the corner from being torn off.

On a side opposing the mounting surface 116, facing the rear edges of the vehicle's cargo area frame, the sealing element 110 further includes an inner extension 122 and an outer extension 124. The inner and outer extensions 122, 124 are slender projections protruding from the main, thicker portion of the sealing element 110 body. Although illustrated as substantially identical in size, the inner and outer extensions 122, 124 may be formed of differing dimensions depending on their function as described below. In one example, the inner extension 122 has a thickness ($t_i$) in the range of 1.0-3.0 inches (2.5-7.6 cm), and the outer extension 124 similarly has a thickness ($t_o$) in the range of 1.0-3.0 inches (2.5-7.6 cm).

The internal area between the inner and outer extensions 122, 124 forms an abutment cavity 126. The abutment cavity 126 is bounded by an inner sealing surface 128 on one side, an outer sealing surface 130 on an opposing side, and an impact-absorbing surface 132 on a third side, forming a U-shaped structure. The abutment cavity 126 is sized to accept the rear frame of the vehicle cargo area when a vehicle such as tractor trailer backs into the loading dock. The abutment cavity 126 defines a distance D, the distance between the inner sealing surface 128 and the outer sealing surface 130. In one aspect, when the sealing device is a side member such as member 110a (FIG. 1), the distance D may be a width dimension (e.g., in the lateral direction along the x-axis) sized to accommodate not only all manner of vehicle cargo area frames, including when the panel doors are open, but also sized for the often-encountered situation when a trailer is not backed in square to the loading dock or off-center from the loading dock. In the event the sealing device is a header portion 110c (FIG. 1), the distance D is a vertical distance along the z-axis. The vertical distance D accounts for differing heights of vehicle cargo area frames as well as the situation where a trailer is backed up to the loading dock using less-conventional means such as a trailer dolly or the like. The inventors have determined a distance D in the range of 8-16 inches provides adequate clearance for most scenarios. In some embodiments, the distance D may be different between the vertical and horizontal members because the width dimension may not vary as much as the vertical dimension. In one example, the abutment cavity 126 in the vertical members (e.g., 110a and 110b) may have a distance D in the range of 8-12 inches, and the abutment cavity 126 in the horizontal header member 110c may have a distance D in the range of 12-16 inches. In another example, the abutment cavity 126 in the vertical members may have a distance D in the range of 10.7 inches±1 inch, and the abutment cavity 126 in the horizontal header member 110c may have a distance D in the range of 14.0 inches±1 inch.

The impact-absorbing surface 132 absorbs the direct contact of the vehicle cargo area rear face as the vehicle backs into and makes contact with the loading dock, typically the dock bumpers 134 shown in FIG. 1. In one embodiment of the invention, at least a portion of the impact-absorbing surface 132 is substantially parallel to the mounting surface 116 so as to provide a planar face for the initial impact of the vehicle cargo area rear face. In the illustrated example, the impact-absorbing surface 132 is curvilinear, with a small portion being parallel to the mounting surface 116. The impact-absorbing surface 132 juts out farther away from the loading dock than the contacting surface of the dock bumpers 134. In this manner, a trailer's cargo area rear face will first contact the impact-absorbing surface 132 before contacting the dock bumpers 134. This is illustrated in FIG. 2 wherein a zone 136 is shown in phantom line to illustrate one possible range of contact surfaces on the dock bumpers 134 relative to the impact-absorbing surface 132. As can be appreciated with reference to the drawing, the location of the impact-absorbing surface 132 relative to the contacting surface of the dock bumpers 134 may vary according to the particular geometry of the sealing element 110. In some applications, the design may call for placement of the impact-absorbing surface 132 closer with respect to the dock bumpers 134, illustrated as dimension m in the longitudinal direction. In other configurations, placement of the impact-absorbing surface 132 may be farther away from the dock bumpers 134, illustrated as dimension n. In either case, the soft and pliable sealing element 110 is compressed by the vehicle's cargo area rear face through a longitudinal distance m or n at the impact-absorbing surface 132 until the vehicle cargo area rear face contacts the dock bumpers 134 and no further compression takes place.

Figure 3:
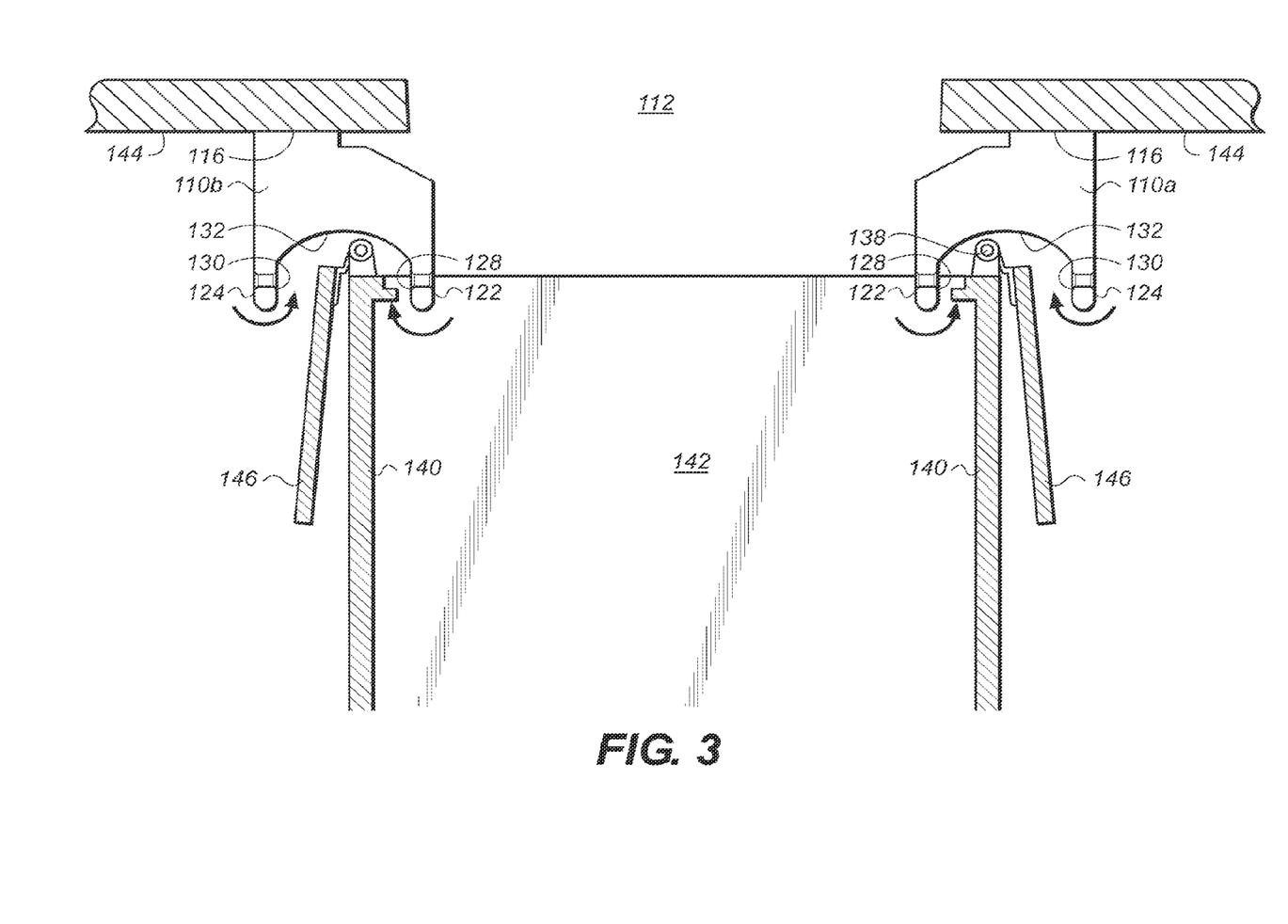
FIG. 3 depicts a cross-sectional top view of a loading dock, a vehicle having a cargo area, and the sealing element of FIG. 1.

Referring now to FIG. 3, shown is a cross-sectional top view of a trailer backing into the sealing element 110 on the loading dock 112. As the truck cargo frame 138 backs into and contacts the impact-absorbing surface 132 of the sealing element 110, the sealing device begins to compress. It should be noted that the truck cargo frame 138 may include the panel door hinges, as shown, or the flat sections of steel frame that provide structure to the trailer. During the act of compression, the sealing element 110 deforms in a manner such that the inner extension 122 bends away from the loading dock 112, as shown by the arrows, and towards an inside wall 140 of the vehicle's cargo area 142. Because the inner sealing surface 128 is at a transverse angle relative to the mounting surface 116, (e.g., perpendicular), the inner extension 122 eventually contacts the inside wall 140 when the rear frame of the vehicle presses against the impact-absorbing surface 132. Also, because the mounting surface 116 of the sealing element 110 is tightly secured to a wall 144 of the loading dock 112, and the inner sealing surface 128 of the inner extension 122 is pressed against the inside wall 140 of the vehicle's cargo area 142, an environmental seal is formed between the vehicle cargo area and the outside environment. The seal is particularly effective in sealing against the hinge gap.

The transverse angle of the inner sealing surface 128 and the outer sealing surface 130 does not have to be perpendicular. In some embodiments the transverse angle, as measured from the lateral x-axis, may be shallow, such as about 20°, to provide a wider opening for the abutment cavity 126. Figuratively speaking, the abutment cavity 126 may "yawn open" in some embodiments to allow a greater distance D, thereby allowing a greater variance of trailer frames. In this manner, the inner sealing surface 128 may have a first position in spaced-apart relation to the inside wall 140 of the vehicle cargo area 142 when no force is applied to the impact-absorbing surface 132, and a second, sealed position when the force is applied to the impact-absorbing surface.

In some embodiments it may be desirable to provide an additional measure of sealing against the outside environment. Therefore, during the act of compression the outer extension 124 may bend towards the loading dock 112, as indicated by the arrows, and towards an outside wall 146 of the vehicle's cargo area 142, eventually contacting the outside wall. In the illustrated example, the outside wall 146 is the inside surface of a door panel on the back of the vehicle. In other examples, such as a vehicle having a roll-up door, the outer sealing surface 130 contacts and seals against the outside of the side panel. Because the outer sealing surface 130 of the outer extension 124 is essentially transverse or perpendicular to the mounting surface 116, an additional environmental seal is formed between the vehicle cargo area 142 and the outside environment when the rear frame of the vehicle presses against the impact-absorbing surface 132. This additional seal may be particularly useful in sealing the cargo area against the outside environment in the event of a failure in the primary seal. As described with reference to the inner sealing surface 128, in some embodiments the transverse angle, as measured from the lateral x-axis, may be shallow, such as about 20°, to provide a wider opening for the abutment cavity 126.

In other embodiments, the impact-absorbing surface 132 may provide an additional measure of sealing against the outside environment. In one example, the inner sealing surface 128 of the inner extension 122 provides the primary seal against the inside wall 140 of vehicle cargo area 142, and the impact-absorbing surface 132 provides a secondary or auxiliary seal against the vehicle's rear cargo frame 138. In another example, the outer sealing surface 130 of the outer extension 124 provides the primary seal against the outside wall 146 of the vehicle's cargo area 142, and the impact-absorbing surface 132 provides a secondary or auxiliary seal against the vehicle's rear cargo frame 138. In this manner, the combination of sealing surfaces may provide far better sealing capability than currently exists.

Referring back to FIG. 2, the sealing element 110 is disclosed as having an internal cavity 114. In some embodiments, the internal cavity 114 further includes a support 148. The support 148 may be required to aide in the deflection of the inner and outer extensions 122, 124 and/or to limit the degree of compression of the sealing element 110 in the longitudinal direction. In one example, the support 148 is foam. In some embodiments including a flexible polyvinylchloride forming a closed skin and internal cavity 114, the support 148 (and the board 118) may be included by slitting the skin to open the cavity, positioning the support and board therein, then closing up the skin by securing it to the board.

In one embodiment of the present invention, the internal cavity 114 of the sealing element 110 is pressurized. Pressurizing the cavity provides additional resiliency in the event of shock loads. The sealing element 110 may be pressurized and sealed at the point of manufacture, or may have provisions (not shown) to pressurize the segments at the point of use. In one example, the sealing element 110 may have fittings to pressurize the internal cavity with shop air.

In order to aide in directional deformation of the inner and outer extensions 122, 124 and to effect a good seal with walls of the vehicle cargo area, the sealing element 110 may further include a strengthening member 150 formed on the inner sealing surface 128, the outer sealing surface 130, or both. Directional deformation allows the sealing element 110 to compress or deflect in one axis while resisting compression or deflection in another axis. In one embodiment, the strengthening member 150 is a hollow cylindrical tube formed into an eyelet through the internal cavity 114. The strengthening member 150 may be formed during the rotational molding process by securing it to the mold and spinning the thermoplastic polymer around it. In the illustrated embodiment, the strengthening members 150 in the inner and outer extensions 122, 124 would resist deflection, particularly rolling, in the lateral direction while having no affect on deflection in the longitudinal direction. Although not illustrated in the accompanying drawings, the strengthening members 150 could also include raised ribs formed on the skin or surface of the sealing element 110. The ribs could be aligned in such a manner so as to allow deformation in one axis while limiting deformation in another axis.

One noted problem with prior art foam dock seals is that they deteriorate over time with repeated hits by the tractor trailer, fork trucks, hand trucks, and the like. In particular, an operator of a tractor trailer may hit the dock seal structure with a large force or shock load. Also, as cargo is loaded and unloaded, the weight of the cargo and the fork truck caused the trailer to repeatedly rise and fall, which in turn caused the trailer frame to scuff, scratch, and wear down the loading dock seal. Even weather elements contribute to the deterioration.

In some embodiments, then, the sealing element 110 may be formed of a material that provides superior resistance to abrasion so as to withstand the rigors of large shock loads, vertical movement of the vehicle trailer, weather, and the like. In one example, at least the impact-absorbing surface 132 comprises an abrasion-resistant material. The abrasion resistance of the material, or resistance to wear, may be measured by a standardized test method such as Taber abrasion test ASTM D4060, which measures a plastic's weight loss when subjected to a weighted abrasion wheel. In one example, the weight loss of the material when subjected to ASTM D4060 testing is less than 5%. In another example, the weight loss of the material is less than 1%. In yet another example, the weight loss of the material is less than 0.5%. An exemplary material meeting an acceptable abrasion resistance value is the aforementioned flexible polyvinylchloride. Initial testing using flexible PVC material demonstrated superior resistance to the abrasive loads imparted to the seal structure by the trailer frame. In fact, the inventor noted that once the seal is established on the inner and outer sealing surfaces 128, 130, movement of the trailer did not result in movement of the sealing surfaces; the pliant nature of the material resulted in the movement being taken up at some other portion of the sealing device.

One of the advantages of the present disclosure is that the sealing device does not transfer shock loads from the truck to the building structure. The loads are absorbed primarily by the compression of the impact-absorbing surface 132 and the deflection of the inner and outer extensions 122, 124. Further, because the sealing element 110 is formed of a material having superior abrasion resistance, the material can withstand the relative vertical motion of the truck cargo frame 138 against the inner and outer sealing surfaces 128, 130 without losing its sealing capability.

Another advantage of the disclosed sealing device is that, when compressed, it places far less compressive load on the building than traditional foam dock seals. The foam material used in traditional dock seals typically exhibits compression force deflection (CFD) properties that follow a linear relationship. That is, the further the foam dock seal is compressed, the harder it pushes against the building. The foam material generally juts out about 6 inches farther than the dock bumper, and undergoes steady compression (and increasing force on the building) until the truck hits the dock bumper. When the truck is parked against the dock bumper, the foam continues to exert a force on the building, being in a compressed state. By one estimate, a traditional foam dock seal having about 27 linear feet of contact area may exert up to 2,000 pounds force on the building wall. In contrast, the CFD properties of the disclosed sealing device are quite different, primarily due to its geometric shape. In one aspect, due to its hollow, soft and pliable nature, the sealing device expands somewhat akin to a balloon under compression so the longitudinal force exerted by the truck is reacted out in other directions, including the lateral directions. As a result, the force required to achieve the same deflection in the longitudinal direction is substantially smaller, and therefore the load on the building is smaller. In embodiments wherein the sealing device includes a foam support 148, the support may be configured to tailor the compression force deflection properties in the longitudinal direction so as to further decrease the load on the building while still providing an adequate seal. In one aspect, the inventor estimates the compressive load imposed upon the building may be reduced by more than 50 percent, and possibly by as much as 75 percent.

Another advantage of the disclosed sealing device is that it provides a large degree of flexibility for the truck driver maneuvering the cargo frame to the loading dock. The cargo frame, such as a tractor trailer, does not have to be perfectly aligned with the loading bay door in order to remain sealed from the outside environment. The wide abutment cavity compensates for any misalignment between the truck and the dock. This feature is particularly advantageous when leakage to the external environment is critical, such as when the refrigerated cargo is subject to compliance with governmental regulations.

Figure 4:
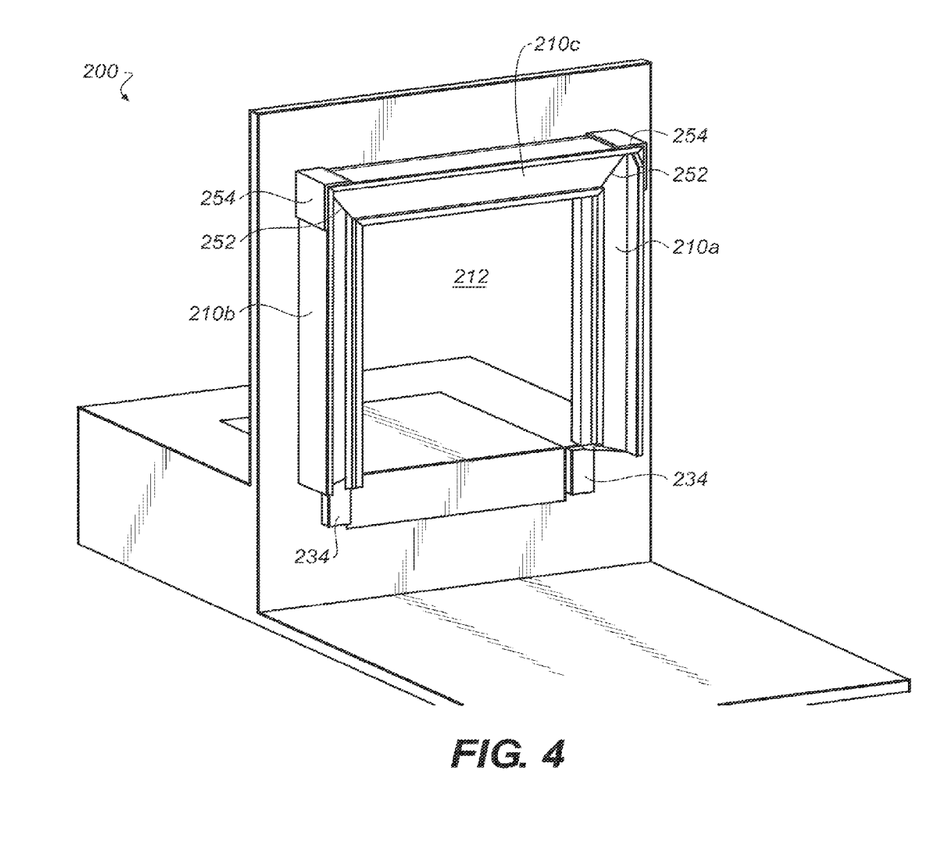
FIG. 4 depicts a perspective view of a loading dock sealing assembly according to another embodiment of the current invention.

FIG. 4 depicts a loading dock sealing assembly 200 according to another embodiment of the invention, in which the two joining corner members (110d, 110e, FIG. 1) are eliminated in favor of a miter joint 252. The inventors have discovered that the miter configuration provides easier and more reliable assembly, and superior protection against leaks when compressed. In this regard, many other types of dock seal could utilize the miter configurations to realize similar advantages. In one aspect of the invention, then, the sections of the foam block dock seal described above could form a miter joint.

Figure 5:
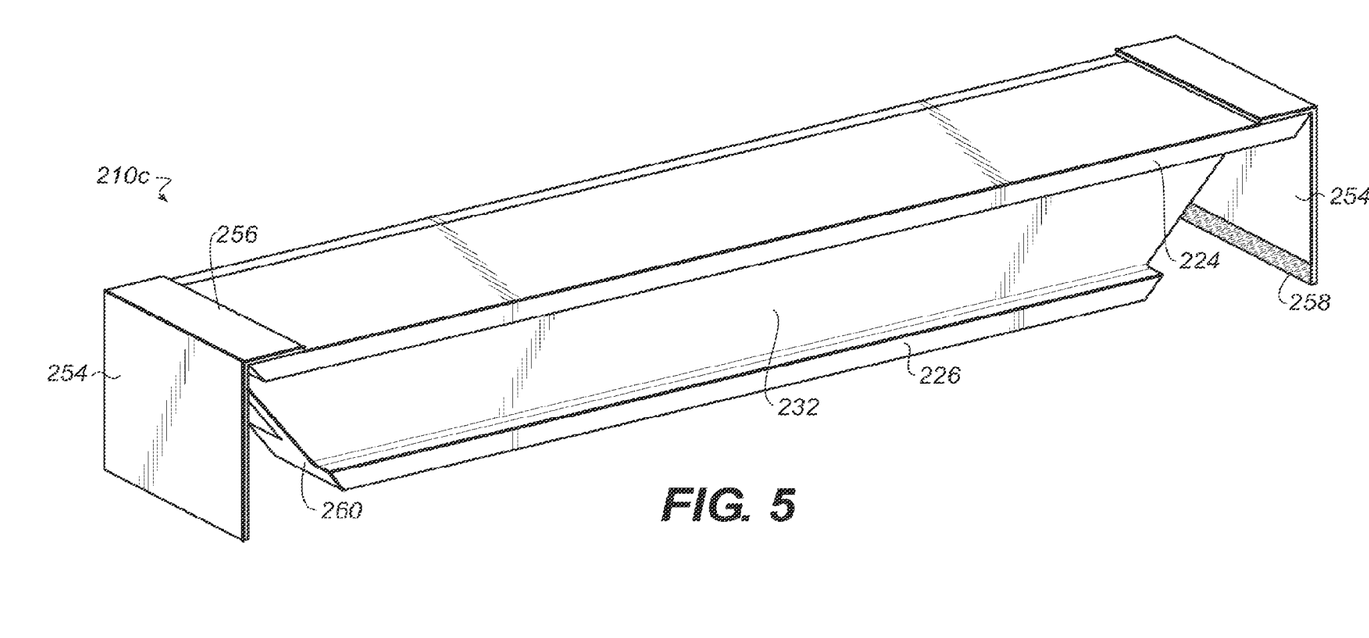
FIG. 5 depicts a perspective view of a header sealing element in FIG. 4.

FIG. 5 depicts a perspective view of the header sealing element 210c. The dock seal assembly 200 may include a skirt 254 atop the header sealing element 210c to provide protection from weather elements. The skirt 254, which may be formed of the same material as the sealing elements 210, may be suitably fastened to the sealing element 210 by stitching 256, for example, or by a hook and loop fastener 258. As shown, the skirt 254 is stitched in permanent fashion to the header sealing element 210c, and then, once installed, fastened to the vertical header sealing elements 210a, 210b using the hook and loop fastener 258.

Figure 6:
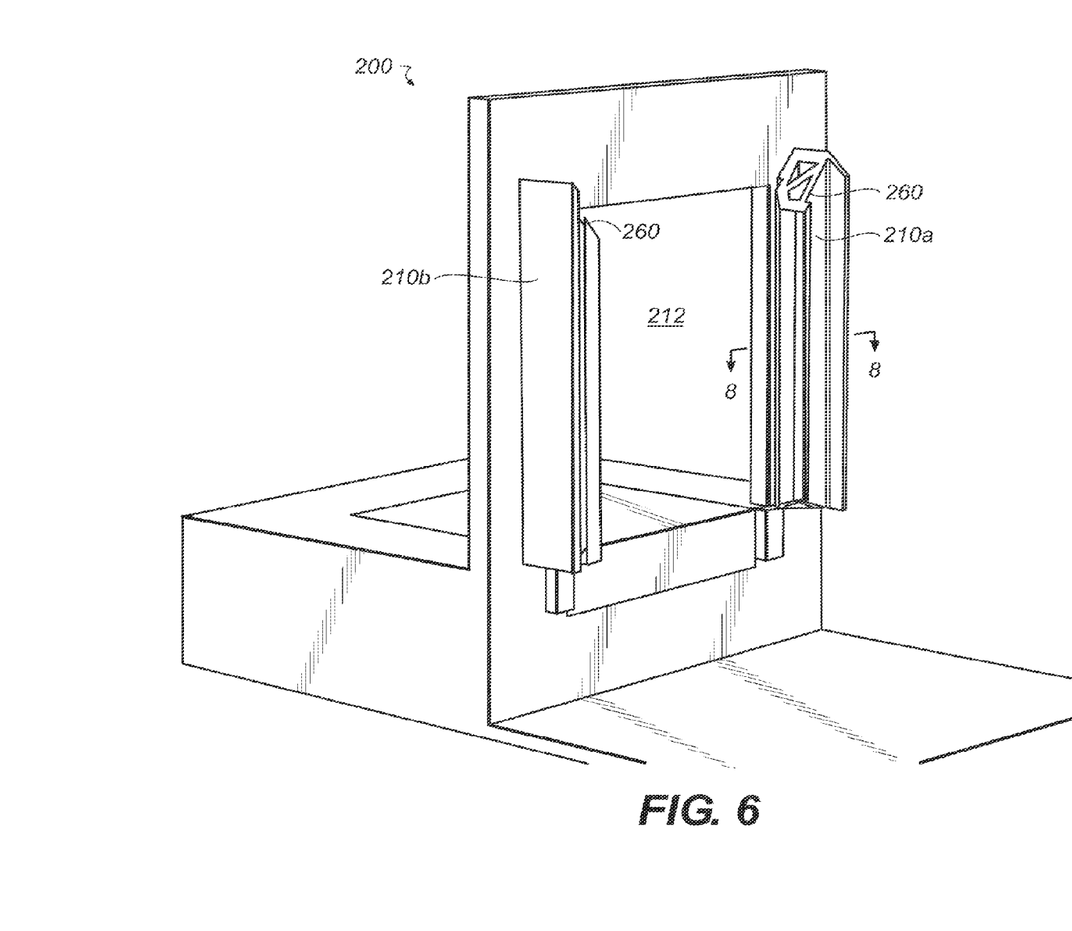
FIG. 6 depicts another perspective view of the loading dock sealing assembly of FIG. 4.
Figure 7:
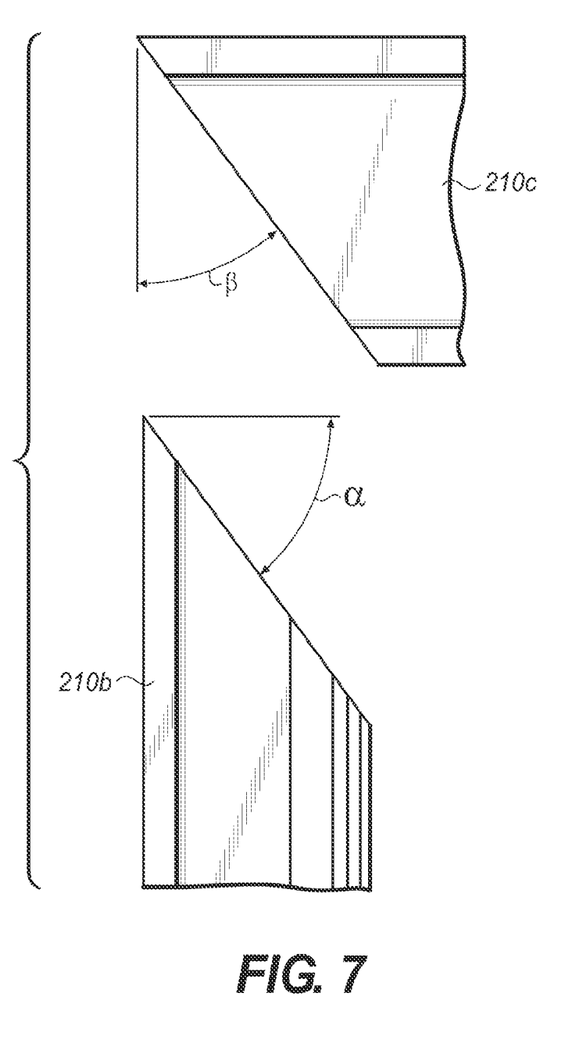
FIG. 7 depicts an exploded front plan view of a miter joint in FIG. 4.

FIG. 6 depicts the loading dock sealing assembly 200 with the header sealing element 210c removed for clarity, and FIG. 7 depicts an exploded front plan view of the miter joint 252. The upper end of the two vertically-oriented side members 210a and 210b and the opposing ends of the header section 210c may include beveled edges 260 to form the miter joint 252 shown in FIG. 4. A miter angle of 45° provides an adequate joint 252. That is, a bevel angle α of 45° on the vertical sealing elements 210a, 210b and a bevel angle β of 45° on the header section 210c proved satisfactory. However, the inventors have determined that a bevel angle α of 51° on the vertical sealing elements 210a, 210b and a bevel angle β of 39° on the header section 210c provided superior performance in terms of mating.

Figure 8:
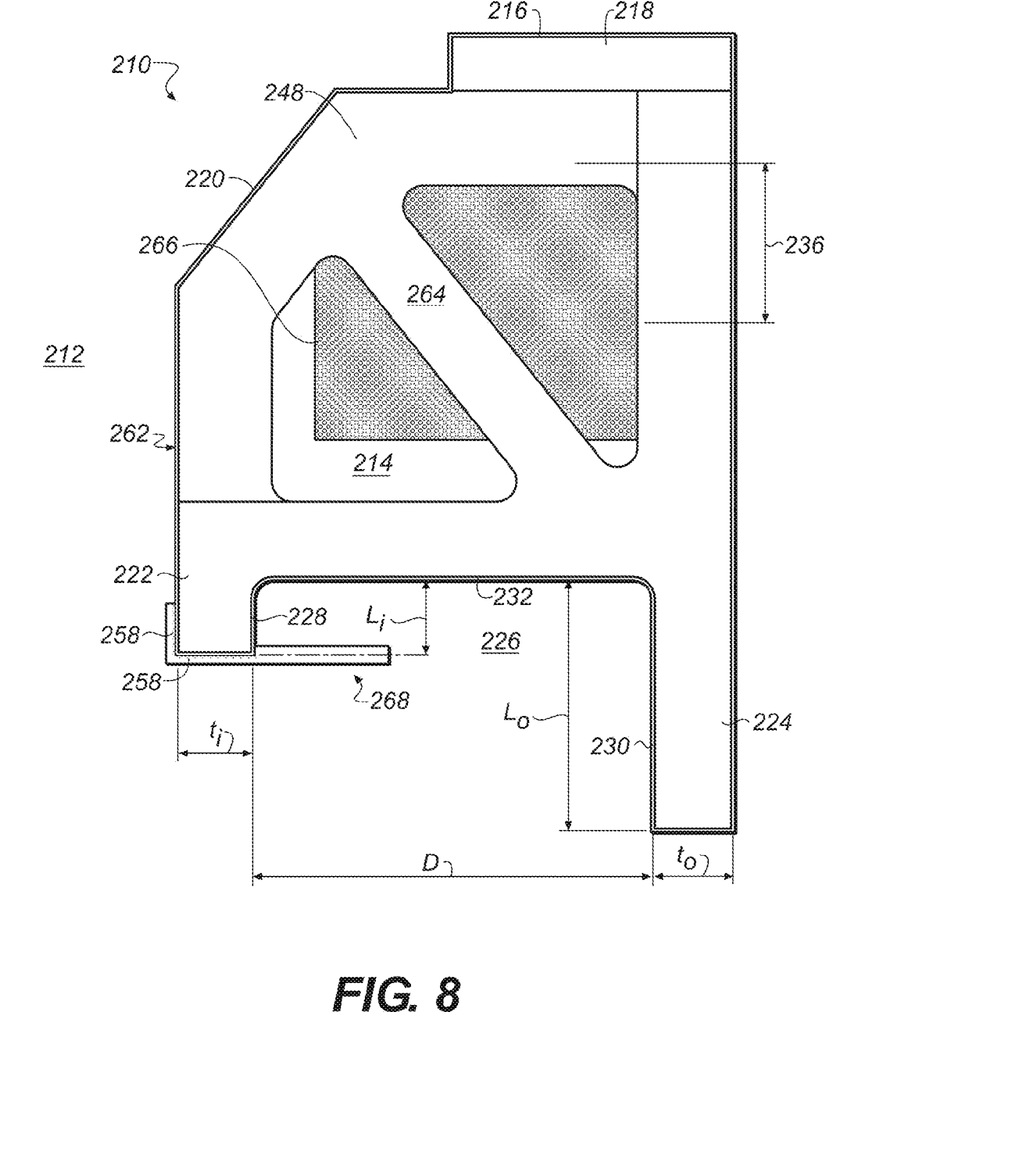
FIG. 8 depicts a cross-sectional top view of a sealing element in FIG. 4.

Referring now to FIG. 8, wherein like numbers indicate like elements from FIG. 2, depicted is a cross-sectional view of a sealing element 210 according to one embodiment of the present invention. Although vertical sealing element 210a is specifically illustrated, the features and structure are essentially the same for the other sealing elements 210b and 210c. The sealing element 210 is stiffer in regions than the embodiment described with respect to FIG. 2, but still retains the flexibility to effect a superior seal against a truck cargo frame.

The sealing element 210 includes a core support 248 and mounting board 218 overwrapped with a soft, pliable skin 262. The sealing element 210 includes a mounting surface 216 coplanar with the loading dock and adapted for installation to the wall of the building. As described above, the installation means may include an adhesive or, as illustrated, a 2"×8" wooden board 218 secured on one face to the sealing element 210 and on an opposing face to the building using conventional hardware. The back side of the sealing element 210 may include a relief 220 intended to minimize the effects of contact with fork trucks and the like. The relief 220 may be an angular cut or rounded, similar to a chamfer, to remove the corner of the sealing element 210 facing the inside of the loading dock doorway. In the event of collision or similar contact with fork trucks, hand trucks or the like, the relief 220 prevents the corner from being torn off.

On a side opposing the mounting surface 216, facing the rear edges of the vehicle's cargo area frame, the sealing element 210 further includes an inner extension 222 and an outer extension 224. The inner and outer extensions 222, 224 are slender projections protruding from the main, thicker portion of the sealing element 210 body. In the illustrated embodiment, the inner extension 222 is shorter than the outer extension 224. This arrangement was found to be advantageous for the particular geometry over identically sized extensions. With a longer inner extension 222, the dynamic reaction of the truck backing into the sealing element 210 caused the sealing element to bulge into the loading dock area 212. Although the sealing element 210 still provided a tight seal around the truck cargo frame, the inventors preferred to eliminate the bulging and prevent the sealing element 210 from obstructing the truck cargo area. In other words, one of the design criteria was that the inner extension 222 move away from the inside of the truck when compressed, thereby eliminating the noted deficiency with prior art foam blocks.

In one example, the inner extension 222 has a thickness ($t_i$) in the range of 1.0-3.0 inches (2.5-7.6 cm), and the outer extension 224 similarly has a thickness ($t_o$) in the range of 1.0-3.0 inches (2.5-7.6 cm). The inner extension 222 has a length (Li) in the range of 1.0-5.0 inches, and the outer extension 224 has a length (Lo) of 5.0-8.0 inches.

The internal area between the inner and outer extensions 222, 224 forms an abutment cavity 226. The abutment cavity 226 is bounded by an inner sealing surface 228 on one side, an outer sealing surface 230 on an opposing side, and an impact-absorbing surface 232 on a third side, forming a U-shaped structure. The abutment cavity 226 is sized to accept the rear frame of the vehicle cargo area when a vehicle such as tractor trailer backs into the loading dock. The abutment cavity 226 defines a distance D, the distance between the inner sealing surface 228 and the outer sealing surface 230. In one aspect, when the sealing device is a side member such as member 210a, the distance D may be a width dimension (e.g., in the lateral direction along the x-axis) sized to accommodate not only all manner of vehicle cargo area frames, including when the panel doors are open, but also sized for the often-encountered situation when a trailer is not backed in square to the loading dock or off-center from the loading dock. In the event the sealing device is a header portion 210c, the distance D is a vertical distance along the z-axis. The vertical distance D accounts for differing heights of vehicle cargo area frames as well as the situation where a trailer is backed up to the loading dock using less-conventional means such as a trailer dolly or the like. The inventors have determined a distance D in the range of 8-16 inches provides adequate clearance for most scenarios. In some embodiments, the distance D may be different between the vertical and horizontal members because the width dimension may not vary as much as the vertical dimension. In one example, the abutment cavity 226 in the vertical members (e.g., 210a and 210b) may have a distance D in the range of 8-12 inches, and the abutment cavity 226 in the horizontal header member 210c may have a distance D in the range of 12-16 inches. In another example, the abutment cavity 226 in the vertical members may have a distance D in the range of 10.7 inches±1 inch, and the abutment cavity 226 in the horizontal header member 210c may have a distance D in the range of 14.0 inches±1 inch.

The impact-absorbing surface 232 absorbs the direct contact of the vehicle cargo area rear face as the vehicle backs into and makes contact with the loading dock, typically the dock bumpers 234 shown in FIG. 4. In one embodiment of the invention, a significant portion of the impact-absorbing surface 232 is substantially parallel to the mounting surface 216 so as to provide a planar face for the initial impact of the vehicle cargo area rear face. The impact-absorbing surface 232 juts out farther away from the loading dock than the contacting surface of the dock bumpers 234. In this manner, a trailer's cargo area rear face will first contact the impact-absorbing surface 232 before contacting the dock bumpers 234. This is illustrated in FIG. 8 wherein a zone 236 is shown in phantom line to illustrate one possible range of contact surfaces on the dock bumpers 234 relative to the impact-absorbing surface 232. As can be appreciated with reference to the drawing, the location of the impact-absorbing surface 232 relative to the contacting surface of the dock bumpers 234 may vary according to the particular geometry of the sealing element 210.

The sealing element 210 has an internal cavity 214 and core support 248. The core support 248 aides in guiding the deflection of the inner and outer extensions 222, 224 and/or to limit the degree of compression of the sealing element 210 in the longitudinal direction. In one example, the support 248 is foam. In the illustrated embodiment, the core support 248 forms an outer perimeter, a cross-brace 264, and the inner and outer extensions 222, 224, respectively. The cross-brace 264 provides support to prevent the sealing element 210 from bulging. As noted, the core support 248 and mounting board 218 are overwrapped with a soft, pliable skin 262. In one example, the skin is formed of a soft polymer such as polyvinyl chloride.

The embodiment of the sealing element 210 operates in much the same manner as the embodiment 110 described with respect to FIGS. 2 and 3. That is, using FIG. 3 for 100-series element numbers, as the truck cargo frame 138 backs into and contacts the impact-absorbing surface 232 of the sealing element 210, the sealing device begins to compress. During the act of compression, the sealing element 210 deforms in a manner such that the inner extension 222 bends away from the loading dock 212 and towards an inside wall 140 of the vehicle's cargo area 142. Because the inner sealing surface 228 is at a transverse angle relative to the mounting surface 216, (e.g., perpendicular), the inner extension 222 eventually contacts the inside wall 140 when the rear frame of the vehicle presses against the impact-absorbing surface 232. Also, because the mounting surface 216 of the sealing element 210 is tightly secured to a wall 144 of the loading dock 212, and the inner sealing surface 228 of the inner extension 222 is pressed against the inside wall 140 of the vehicle's cargo area 142, an environmental seal is formed between the vehicle cargo area and the outside environment. The seal is particularly effective in sealing against the hinge gap.

In some embodiments it may be desirable to provide an additional measure of sealing against the outside environment. Therefore, during the act of compression the outer extension 224 may bend towards the loading dock 212 and towards an outside wall 146 of the vehicle's cargo area 142, eventually contacting the outside wall. In the illustrated example, the outside wall 146 is the inside surface of a door panel on the back of the vehicle. In other examples, such as a vehicle having a roll-up door, the outer sealing surface 230 contacts and seals against the outside of the side panel. Because the outer sealing surface 230 of the outer extension 224 is essentially transverse or perpendicular to the mounting surface 216, an additional environmental seal is formed between the vehicle cargo area 142 and the outside environment when the rear frame of the vehicle presses against the impact-absorbing surface 232. This additional seal may be particularly useful in sealing the cargo area against the outside environment in the event of a failure in the primary seal.

The sealing element 210 may further include a vent 266 at one or both ends to control or meter the escape of fluid (e.g., air) from the internal cavity 214. In one embodiment, the vent 266 is a mesh or small-pore screen. The pore size of the vent 266 can be adapted to prevent the rapid escape of fluid from the internal cavity 214, so the sealing element 210 performs, at least initially, in the same manner as the sealing element 110 disclosed with respect to FIG. 2. That is, the internal cavity 214 can briefly pressurize and absorb a significant portion of the impact load, which prevents excessive forces on the building dock wall.

In some circumstances, the inner extension 222 may not deform enough to effect a complete seal. This can happen if the truck is significantly off center, for example. In one embodiment of the invention, the sealing element 210 may further include an extension element 268 coupled to the inner extension 222 to compensate for the difference. In one embodiment, the extension element 268 is a foam flap, which may be covered with the same material as the skin 262. In the illustrated example, the extension element 268 has a rectangular cross section, but could be other suitable shapes, such as oval. The extension element 268 is also depicted as extending perpendicularly to the inner extension 222, but in some geometries the extension element 268 may protrude at an angle, for example 45°. The extension element 268 may be fastened to the inner extension 222 by stitching, glue, or as illustrated, hook and loop fasteners 258.

While the present invention has been described with reference to a number of specific embodiments, it will be understood that the true spirit and scope of the invention should be determined only with respect to claims that can be supported by the present specification. Further, while in numerous cases herein wherein systems and apparatuses and methods are described as having a certain number of elements it will be understood that such systems, apparatuses and methods can be practiced with fewer than the mentioned certain number of elements. Also, while a number of particular embodiments have been described, it will be understood that features and aspects that have been described with reference to each particular embodiment can be used with each remaining particularly described embodiment.

A sample of devices and methods that are described herein are as follows:

A sealing element for sealing a vehicle cargo area to a loading dock, comprising:

a mounting surface coplanar with the loading dock and adapted to sealingly mate against the loading dock;

an inner sealing surface at a transverse angle relative to the mounting surface, adapted to sealingly mate against an inside wall of the vehicle cargo area;

an outer sealing surface opposing the inner sealing surface and at a transverse angle relative to the mounting surface, the outer sealing surface adapted to sealingly mate against an outside surface of the vehicle cargo area; and an impact-absorbing surface approximately parallel to the mounting surface, adapted for contact with a vehicle cargo area rear face;

whereupon application of a force by the vehicle cargo area frame to the impact-absorbing surface, the inner sealing surface deforms to sealingly mate against the inside wall of the vehicle cargo area and the outer sealing surface deforms to sealingly mate against the outside surface of the vehicle cargo area.

The sealing element as set forth in paragraph [0058], wherein the sealing element is formed of a homogeneous thermoplastic polymer.

The sealing element as set forth in paragraph [0059], wherein the thermoplastic polymer is flexible polyvinylchloride.

The sealing element as set forth in paragraph [0058], wherein the impact-absorbing surface comprises a material having a resistance to wear, as measured by ASTM D4060, of less than 0.5% weight loss.

The sealing element as set forth in paragraph [0058], wherein the transverse angle of the inner sealing surface relative to the mounting surface is greater than 20°.

The sealing element as set forth in paragraph [0062], wherein the transverse angle of the inner sealing surface relative to the mounting surface is approximately 90°.

The sealing element as set forth in paragraph [0058], wherein the sealing element defines an internal cavity.

The sealing element as set forth in paragraph [0064], wherein the internal cavity is filled with a fluid.

The sealing element as set forth in paragraph [0065], wherein the fluid is air.

The sealing element as set forth in paragraph [0064], wherein the internal cavity further comprises a support to limit the degree of compression of the sealing element in the longitudinal direction.

The sealing element as set forth in paragraph [0058], wherein the inner sealing surface has a first position in spaced-apart relation to the inside surface of the vehicle cargo area when no force is applied to the impact-absorbing surface, and a second, sealed position when the force is applied to the impact-absorbing surface.

The sealing element as set forth in paragraph [0058], wherein the inner and outer sealing surfaces are adapted to encapsulate the vehicle cargo area frame when the force is applied to the impact-absorbing surface.

The sealing element as set forth in paragraph [0058], wherein the loading dock comprises a loading dock door frame having two vertical members and a head pad, the sealing element extending around the loading dock door frame.

A sealing element comprising:
a body portion, the body portion comprising a mounting surface adapted to sealingly mate against a loading dock, and an impact-absorbing surface approximately parallel to the mounting surface, the impact-absorbing surface adapted for contact with a vehicle cargo area frame;
an inner extension extending from the body portion, the inner extension having an inner sealing surface at a transverse angle relative to the mounting surface of the body portion, the inner sealing surface adapted to sealingly mate against an inside wall of a vehicle cargo area within the vehicle; and
an outer extension extending from the body portion, the outer extension having an outer sealing surface at a transverse angle relative to the mounting surface of the body portion, the outer sealing surface adapted to sealingly mate against an outside wall of the vehicle cargo area.

The sealing element of paragraph [0071], further comprising a strengthening member formed on one of the inner surface and the outer surface of the body, the strengthening member adapted to provide directional deformation.

The sealing element as set forth in paragraph [0072], wherein the strengthening member is a stiffening rib.

The sealing element as set forth in paragraph [0072], wherein the strengthening member is a hollow cylindrical tube.

The sealing element as set forth in paragraph [0071], wherein the outside wall of the vehicle cargo area is an inside surface of a door panel on the back of the vehicle.

The sealing element as set forth in paragraph [0071], wherein an internal area between the inner and outer extensions forms an abutment cavity sized to accept the rear frame of the vehicle cargo area.

The sealing element as set forth in paragraph [0076], wherein the abutment cavity defines a distance D in the range of 10 to 16 inches.

The sealing element as set forth in paragraph [0071], wherein the sealing element extends around a loading dock door frame, the door frame comprising two vertical members and a head pad.

The sealing element as set forth in paragraph [0071], wherein the impact-absorbing surface juts out farther away from the loading dock than the contacting surface of a dock bumper.

What is claimed is:

1. A sealing element for sealing a vehicle cargo area to a loading dock, comprising:
    a mounting surface adapted to sealingly mate against the loading dock;
    a mounting member mechanically coupled to said mounting surface;
    a core support mechanically coupled to said mounting member, said core support comprising:
        walls defining an internal cavity;
        a cross-brace that extends across said internal cavity;
        an impact-absorbing surface of said core support approximately parallel to the mounting surface, said impact-absorbing surface adapted for contact with a vehicle cargo area rear face;
        an inner extension extending from said core support at a transverse angle relative to the mounting surface comprising an inner sealing surface adapted to sealingly mate against an inside wall of the vehicle cargo area;
        an outer extension extending from said core support spaced apart from said inner sealing surface by a distance defined by a width of said impact absorbing surface comprising an outer sealing surface said outer extension opposing the inner sealing surface and at a transverse angle relative to the mounting surface, the outer sealing surface adapted to sealingly mate against an outside surface of the vehicle cargo area; and
    whereupon application of a force by a vehicle cargo area frame to the impact-absorbing surface, the inner sealing surface rotates to sealingly mate against the inside wall of the vehicle cargo area and the outer sealing surface rotates to sealingly mate against the outside surface of the vehicle cargo area.

2. The sealing element as set forth in claim 1, wherein the cross-brace limits a degree of compression of the sealing element in a longitudinal direction.

3. The sealing element as set forth in claim 1, wherein the core support is overwrapped with a pliable skin.

4. The sealing element as set forth in claim 3, wherein the skin is formed from polyvinyl chloride.

5. The sealing element as set forth in claim 1, wherein the transverse angle of the inner sealing surface relative to the mounting surface is greater than 20°.

6. The sealing element as set forth in claim 5, wherein the transverse angle of the inner sealing surface relative to the mounting surface is approximately 90°.

7. The sealing element as set forth in claim 1, further comprising an inner extension protruding from a main body of the sealing element, the inner sealing surface being located on the inner extension.

8. The sealing element as set forth in claim 7, further comprising an outer extension protruding from a main body of the sealing element, the outer sealing surface being located on the outer extension.

9. The sealing element as set forth in claim 8, wherein the inner extension is shorter than the outer extension.

10. The sealing element as set forth in claim 9, further comprising an extension element extending transversely from the inner extension.

11. The sealing element as set forth in claim 1, wherein the inner sealing surface has a first position in spaced-apart relation to an inside surface of the vehicle cargo area when no force is applied to the impact-absorbing surface, and a second, sealed position when the force is applied to the impact-absorbing surface.

12. The sealing element as set forth in claim 1, wherein the inner and outer sealing surfaces are adapted to encapsulate the vehicle cargo area frame when the force is applied to the impact- absorbing surface.

13. The sealing element as set forth in claim 1, further comprising a skirt fastened thereon to provide protection from weather elements.

14. The sealing element as set forth in claim 1, wherein an end of the sealing element includes a beveled edge for forming a miter joint with other sealing elements.

15. A method for sealing a vehicle cargo area to a loading dock, comprising the steps of:
   providing a sealing element comprising:
      a mounting surface adapted to sealingly mate against the loading dock;
      a mounting member mechanically coupled to said mounting surface;
      a core support mechanically coupled to said mounting member, said core support comprising:
      walls defining an internal cavity;
      a cross-brace that extends across said internal cavity;
      an impact-absorbing surface of said core support approximately parallel to the mounting surface, said impact-absorbing surface adapted for contact with a vehicle cargo area rear face;
      an inner extension extending from said core support at a transverse angle relative to the mounting surface comprising an inner sealing surface adapted to sealingly mate against an inside wall of the vehicle cargo area;
      an outer extension extending from said core support spaced apart from said inner sealing surface by a distance defined by a width of said impact absorbing surface comprising an outer sealing surface said outer extension opposing the inner sealing surface and at a transverse angle relative to the mounting surface, the outer sealing surface adapted to sealingly mate against an outside surface of the vehicle cargo area; and
   contacting the impact-absorbing surface with a rear face of the vehicle cargo area; and
   rotating the inner sealing surface to sealingly mate against the inside wall of the vehicle cargo area, and rotating the outer sealing surface to sealingly mate against an outside surface of the vehicle cargo area.

16. The method as set forth in claim 15, further comprising the steps of deforming the outer sealing surface toward the loading dock and sealing the outer sealing surface against an outside surface of the vehicle cargo area.

17. The method as set forth in claim 15, further comprising the steps of providing a cross-brace within an internal cavity of the sealing element, and guiding the rotation of the inner sealing surface.

18. The method as set forth in claim 15, further comprising the steps of coupling a vent to an internal cavity of the sealing element, and controlling the escape of air from the internal cavity.

19. The method as set forth in claim 15, further comprising the step of absorbing, by the sealing element, a load imparted by the vehicle, and reducing the load imparted to the loading dock.

* * * * *